J. D. RICHARDSON.
Recording Instruments for Locomotives.

No. 138,437.      Patented April 29, 1873.

2 Sheets--Sheet 1.

Attest
H. G. Webber
S. J. Brown

Inventor
John D. Richardson
By F. Millward
Attorney

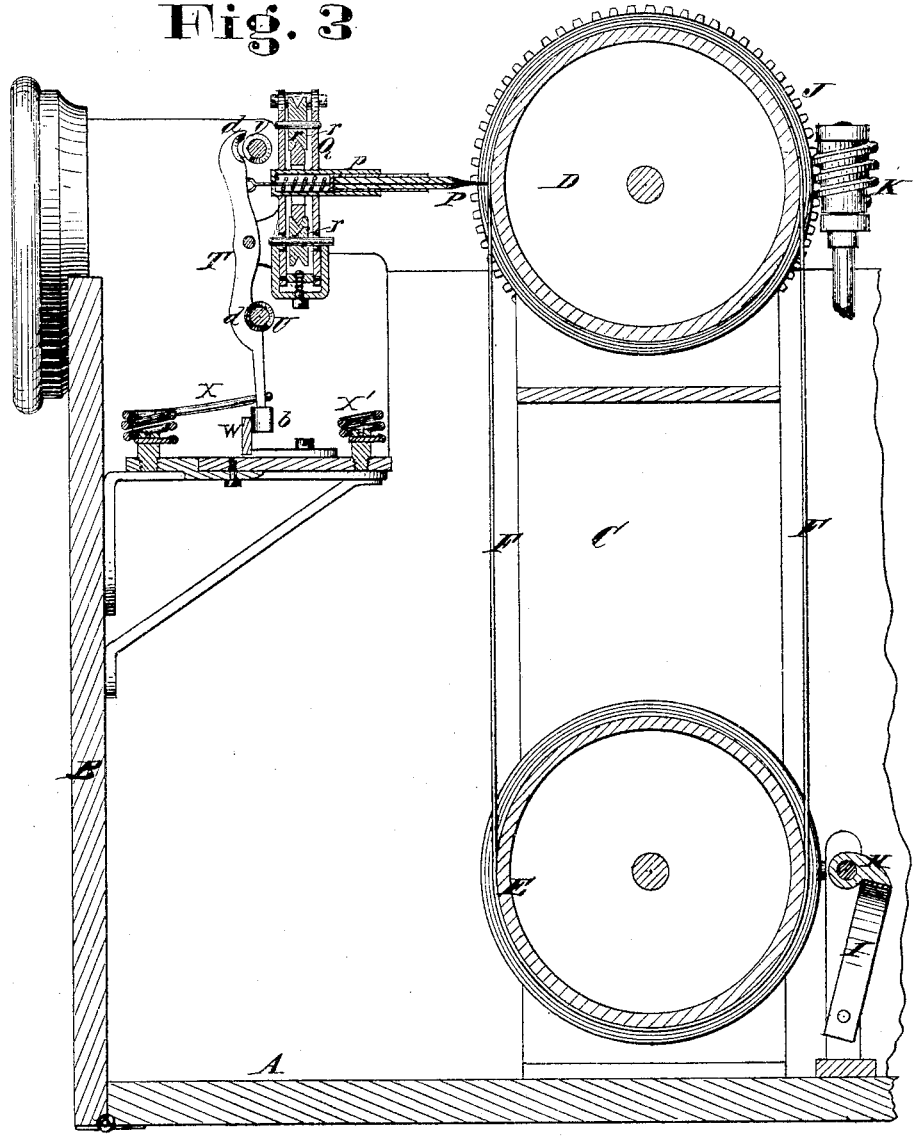

UNITED STATES PATENT OFFICE.

JOHN D. RICHARDSON, OF HOUSTON, TEXAS, ASSIGNOR TO HIMSELF, IRVIN C. LORD, AND MILTON G. HOWE, OF SAME PLACE.

IMPROVEMENT IN RECORDING-INSTRUMENTS FOR LOCOMOTIVES.

Specification forming part of Letters Patent No. 138,437, dated April 29, 1873; application filed September 26, 1872.

*To all whom it may concern:*

Be it known that I, JOHN D. RICHARDSON, of Houston, in the county of Harris and State of Texas, have invented a certain new and useful Improvement in Instruments for Recording Time, Speed, and Steam-Pressure of Locomotives or Cars or other Machinery, of which the following is a specification:

Nature and Objects of Invention.

My invention consists, in the first part, of the provision and combination of, first, an endless revolving chart which is driven from the wheels of the locomotive or other variable-speed machinery at a definite rate relatively thereto, and is ruled with transverse lines to indicate distances and longitudinal lines to indicate the time consumed in traveling the indicated distance; second, a pencil mechanism which, during the motion of the chart, is made by the interposition of a clock to traverse to and fro at a uniform speed across the chart and mark a line upon the same; the object of this part of the invention being to record the number of miles traveled forward or back, the speed per mile, the number of stoppages, and the duration of such stoppages, for the purpose of arriving at the relative value or efficiency of engineers, and performance of locomotives from different makers, and of trains during their trips. My invention consists in the second part of a combination of devices for operating the pencil. My invention consists, in the third part, of the combination of the endless moving chart for recording distance, the reciprocating pencil for recording time, and a steam-gage having a pencil attached to describe a line upon the chart, the variations of which record the steam-pressure at any distance or point, or any hour or minute on the road.

Description of the Accompanying Drawing.

Figure 1:
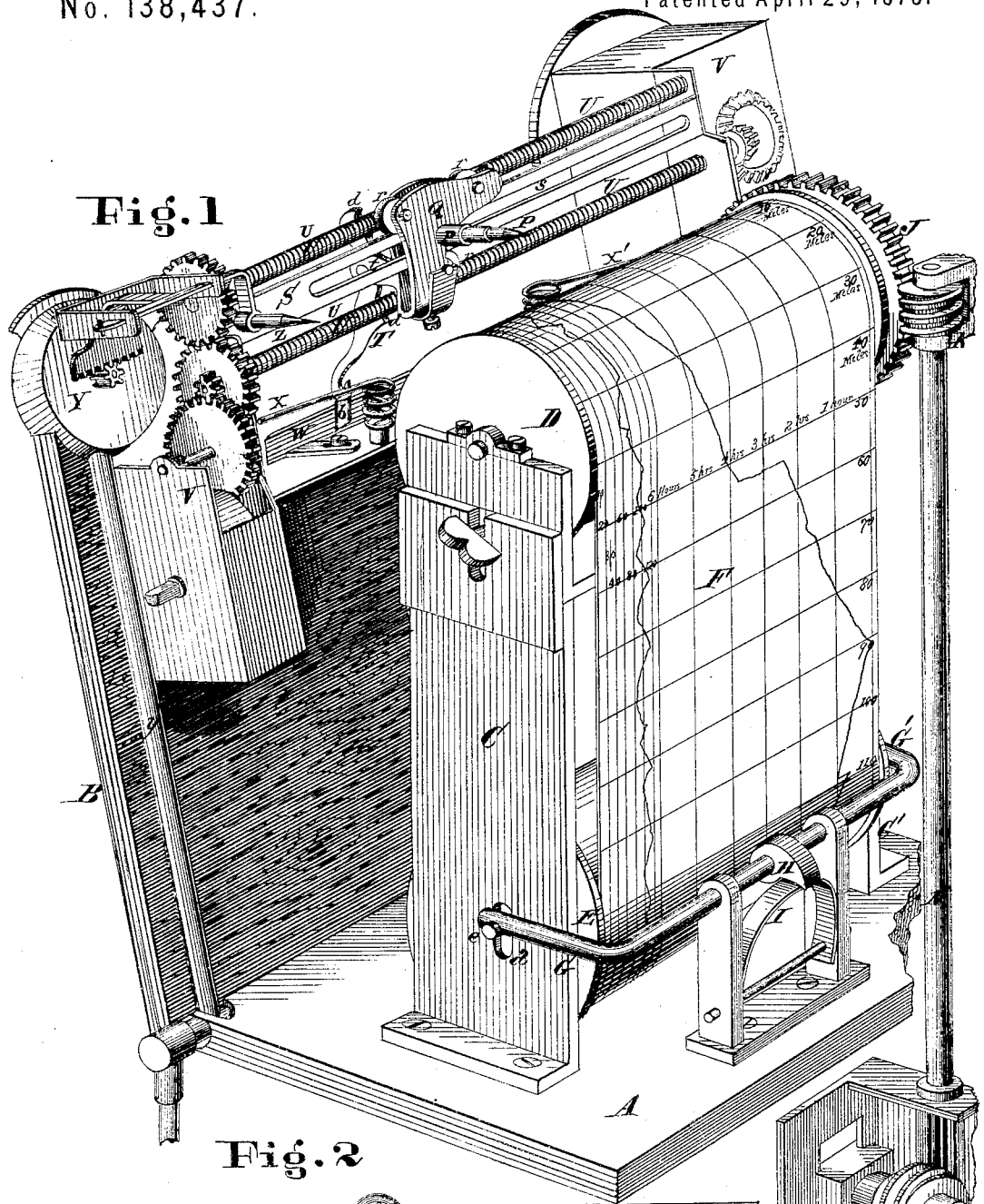
Figure 2:
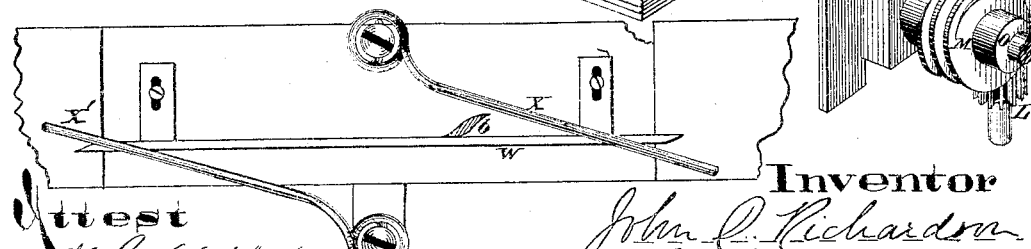

Figure 1 is a perspective view of an instrument embodying my invention. Fig. 2 is a plan of the device for reversing the motion of the time-recording pencil. Fig. 3 is a vertical cross-section of the instrument.

General Description.

The principal parts of this instrument may be contained in a box, of which A is the stationary part and B the hinged side for opening the same for the inspection or repair of the operative parts. The box may be under lock and seal, or either, only to be broken by the proper officers of the road. The uprights C C' support a cylinder, D, in a suitable journal-bearing, and have slots $a$ to receive the journals $e$ of the lower cylinder E. The paper chart F is stretched over the cylinders D E and tightened by means of the swinging arms G G', cam H, and spring I in the manner clearly shown. The cylinders and chart are rotated by means of worm-wheel J, worm K, worm-wheel, worm, and shaft L M N, and shaft O, the latter of which may be one of the axles of the locomotive or car. It is preferable that the axle or shaft O shall not be one of the driving-wheels axles, but should be the axle of wheels which rest and roll upon the track without slippage. In the direction of its motion the chart F is spaced by lines into miles or other representations of distances, and is spaced crosswise by lines running lengthwise into intervals representing time, as shown, so that as the chart moves continuously when the locomotive or car is in motion the pencil reciprocates and describes a line from which can be seen the actual performance of the engine upon the road in miles, time, and pressure of steam. If the locomotive is at rest the pencil still moves and records by a straight line the number of minutes or hours expended in the stoppage or rest. As the pencil is not likely to travel over the same line twice the chart may be used for a long trip without any confusion of the record—that is to say, the entire length may pass under the action of the pencil a great number of times without necessitating a confusion of the record—as the record-line can be easily traced from the point of starting to the termination of the trip. P is the pencil used to trace the line indicating time and distance upon the chart. It is supported in the frame Q by the intervention of rollers r upon the slide S, which is attached to the folding side B. The pencil passes into a socket, p, which may have a coiled spring within it to give elasticity to the action of the pencil upon the chart, and the pencil may pass through the slot s in the slide S to permit of the employment of a suitable device for withdrawing the pencil temporarily from the chart against the force of its spring for adjustment or otherwise. By means of a projecting bracket, t, the frame Q is made to support a lever, T, the bracket furnishing the fulcrum for the same. Two screws, U, revolving in opposite directions, are journaled in suitable supports attached to the folding side B and rotated at a uniform speed by one or both of the clocks V in the manner shown. A plate, W, is adjustably attached to the side B, against each side of which the toe b of the lever T is made to press alternately. The lever T is provided with sectional nuts d d to fit the screws U, one of which nuts is arranged to be in gear with its screw while the other is out. When either of the nuts is in gear and the screws U are in motion by means of the clock, the screw into which the nut meshes moves the lever and its accompanying frame Q and pencil P in one direction until the toe b reaches the end of the plate W. The spring X or X' then throws the toe over to the other side of the plate W, and in so doing releases one of the nuts d, throws the other into gear, and thus instantly reverses the direction of motion of the pencil. Y is a steam-gage, the pipe Y of which has a universal joint at the point of vibration of the folding side B. The usual mechanism of the gage is made to give a reciprocating motion to a pencil, Z, which, in the operation of the instrument, describes a line upon the space covered by the series of lines on the chart, 10, 20, 30, &c., indicating steam-pressure. The pencil Z is arranged to operate with the pencil P for the purpose of recording the pressure of steam in line with the record of time, so that from the chart can be ascertained the exact pressure of steam carried at any particular time and particular location upon the road.

Claims.

1. The combination of the rotating chart F, ruled transversely and longitudinally to indicate distance and time, and driven from the wheels of the car or locomotive at a definite rate, and a pencil, P, operated by a clock to continuously traverse back and forth across the path of the chart, substantially as and for the purpose specified.

2. The combination of rotating shaft F operating substantially as described, pencil P, screws U, lever T d b, plate W, and springs X X', connected and operating substantially in the manner and for the purpose stated.

3. In combination with the elements of the preceding clause, the steam-gage Y and reciprocating pencil Z, as and for the purpose specified.

In testimony of which invention I hereunto set my hand.

JOHN D. RICHARDSON.

Witnesses:
FRANK MILLWARD,
J. L. WARTMANN.